US006885467B2

(12) United States Patent
Du-Nour et al.

(10) Patent No.: US 6,885,467 B2
(45) Date of Patent: Apr. 26, 2005

(54) METHOD AND APPARATUS FOR THICKNESS DECOMPOSITION OF COMPLICATED LAYER STRUCTURES

(75) Inventors: Ofer Du-Nour, Timrat (IL); Vladimir Rubinstein, Haifa (IL)

(73) Assignee: Tevet Process Control Technologies Ltd., Moshava Yokneam (IL)

( * ) Notice: Subject to any disclaimer, the term of this patent is extended or adjusted under 35 U.S.C. 154(b) by 312 days.

(21) Appl. No.: 10/281,207

(22) Filed: Oct. 28, 2002

(65) Prior Publication Data

US 2004/0080761 A1 Apr. 29, 2004

(51) Int. Cl.[7] .............................................. G01B 11/28
(52) U.S. Cl. .................................... 356/630; 250/461.1
(58) Field of Search ......................... 356/630, 635–636, 356/432, 364–369; 250/560, 461.1, 459.1, 458.1

(56) References Cited

U.S. PATENT DOCUMENTS

| 4,841,156 | A | * | 6/1989 | May et al. ................. 250/461.1 |
| 5,227,861 | A | * | 7/1993 | Nishizawa et al. ......... 356/497 |
| 5,450,205 | A | * | 9/1995 | Sawin et al. ................. 356/632 |
| 5,773,316 | A | * | 6/1998 | Kurosaki et al. ............. 438/16 |
| 6,268,916 | B1 | * | 7/2001 | Lee et al. .................... 356/369 |

FOREIGN PATENT DOCUMENTS

WO    WO 00/12958 A1    3/2000

* cited by examiner

Primary Examiner—Gregory J. Toatley, Jr.
Assistant Examiner—Sang H. Nguyen
(74) Attorney, Agent, or Firm—G.E. Ehrlich (1995) Ltd.

(57) ABSTRACT

Thickness measurement apparatus for measuring layer thicknesses on patterned areas of a semiconductor wafer, comprises: a spectrum analyzer for obtaining reflection data taken from a patterned area and obtaining therefrom a frequency spectrum, a peak detector for searching the spectrum to find peak frequencies within said spectrum, the search being restricted to regions corresponding to peak frequencies found in an earlier learning stage, a frequency filter, associated with the peak detector, for filtering the spectrum about said peak frequencies, and a maximum likelihood fitter for using parameters obtained in the learning stage to carry out maximum likelihood fitting of said filtered spectrum to obtain the desired layer thicknesses. By carrying out maximum likelihood fitting using parameters obtained beforehand in a high resolution non-real time learning stage, it is possible to provide high resolution results in real time.

26 Claims, 9 Drawing Sheets

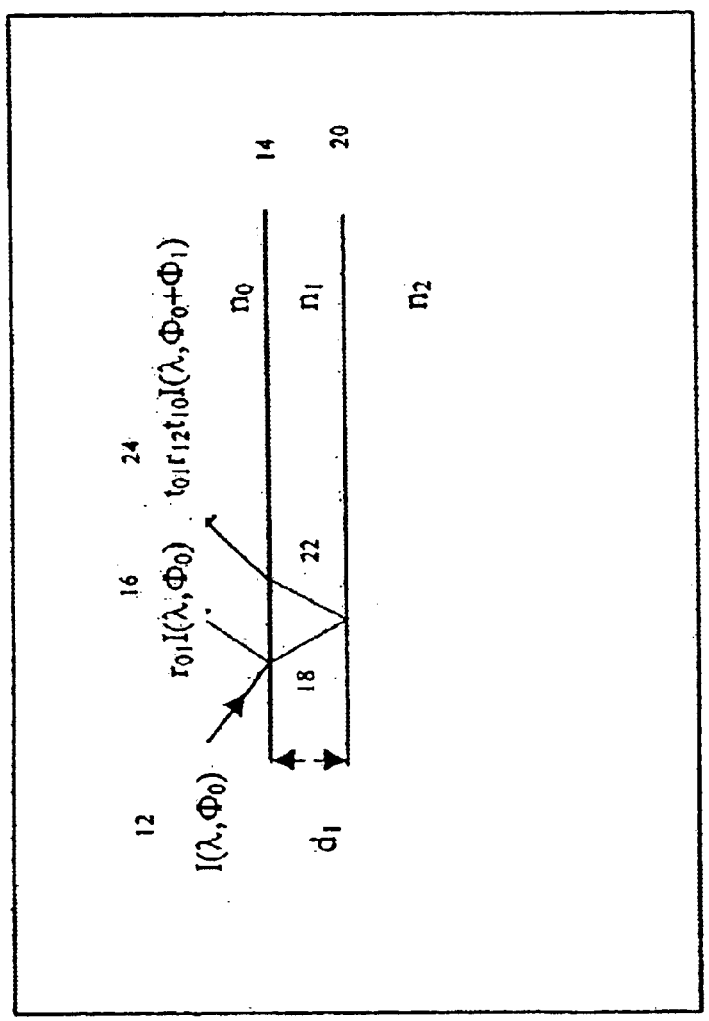
Fig 2 – Schematic presentation of the reflection coefficient

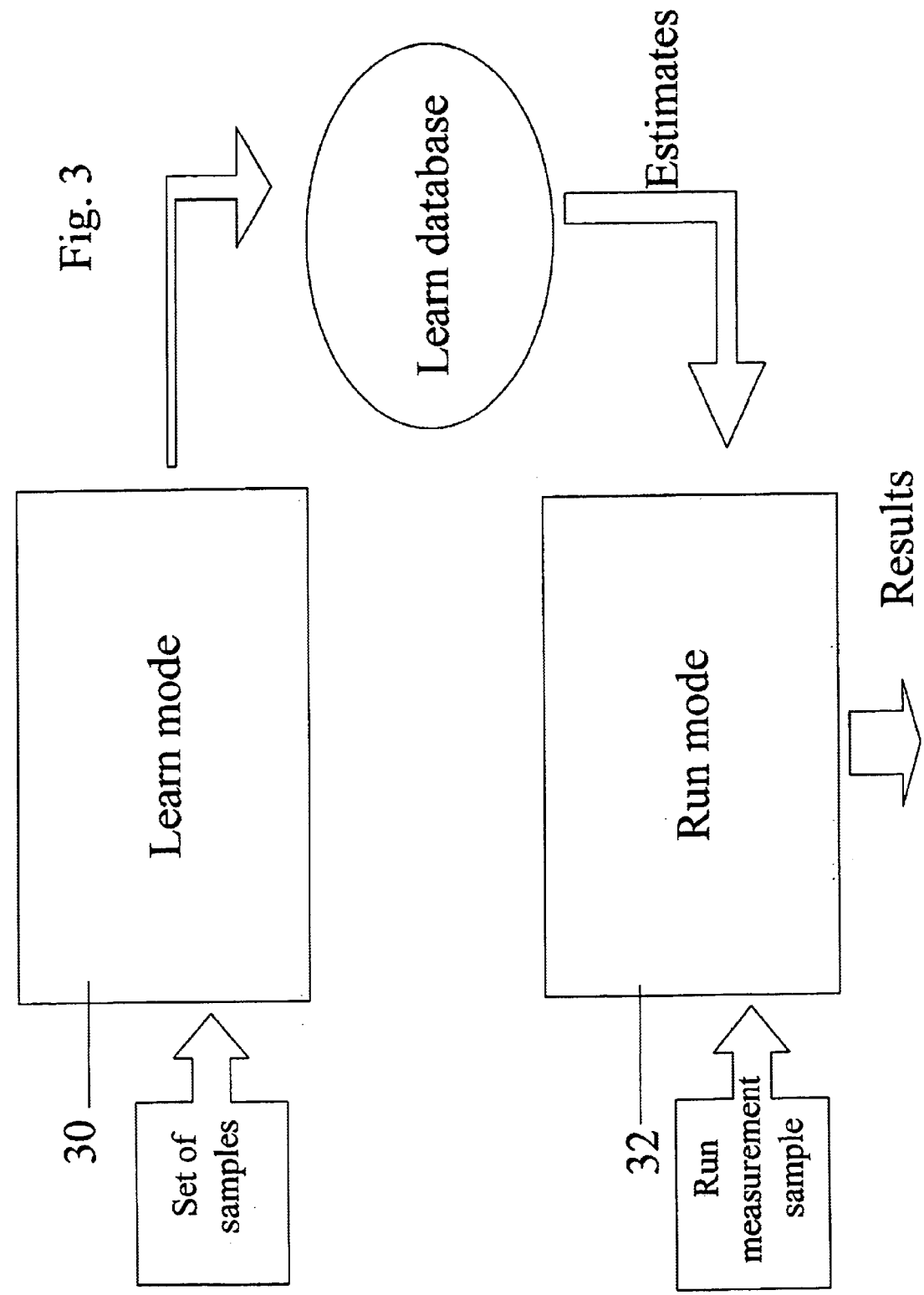

METHOD AND APPARATUS FOR THICKNESS DECOMPOSITION OF COMPLICATED LAYER STRUCTURES

FIELD OF THE INVENTION

The present invention relates to a method and apparatus for measuring physical parameters of complicated layer structures.

BACKGROUND OF THE INVENTION

The manufacturing process of semiconductor devices and similar products such as flat panel displays, MEMS and memory discs, involves numerous process steps where layers are deposited, etched, coated and abraded by polishing. To control process step performance for each unit running in the production line it is important to monitor the physical parameters of the layers before, during, and after the respective process step. Some of the process steps involve selective etching or deposition of the layers to form patterns on the wafer such as metal lines, dielectric or Si trenches, Photo resist patterns etc.

Methods of measuring the layer thickness are well known and may include amongst others:

Reflectometry where interference between the reflected light from the top surface of the layer and the bottom interface of the layer can be traced back to the layer thickness, refractive index and extinction coefficient, and Ellipsometry where the polarity difference between the light reflected from the top and bottom interfaces can be traced back to the layer physical parameters.

The most accurate measurements are achieved on samples where the layer parameters, i.e. thickness, refractive index and extinction coefficient are constant within the measuring beam spot area. The units being produced in the process, such as semiconductor devices, are constructed from a very complicated pattern structure with different layer thicknesses at different locations on the device. The space and width of the patterns vary but can be smaller than 0.1 micron, and the demands of technology constantly call for ever smaller features.

The common methods used in production lines to monitor process performance do not involve measuring production units at patterned areas but use instead samples not previously patterned which are run through the process and then measured using the classical methods of single layer measurement techniques.

Another way to avoid the complicated pattern structure is to include in the measurement tool a sophisticated alignment mechanism that pictures the device using a vision system, finds a large non-patterned area within the device using pattern recognition algorithms and navigates the measuring spot to the non-patterned area using a highly accurate motion mechanism. The method requires the measurement spot to be small enough to fit the non-patterned areas within the production units. Once alignment is complete the measurement is made on the non-patterned area using classical methods. Reference is herein made to FIG. 1b for an example of a measuring spot selected over a non-patterned area of a wafer during the manufacturing process, from which the thickness D may be obtained.

The above methods have limitations when used in the production line. Measurements on evidence samples or on non-patterned areas do not always correlate with the true thickness of the layers on top of the patterned areas, where different physical phenomena occur. The special run that is needed to produce the test sample has the effect of reducing actual production time using the machines and consumes additional raw materials. On the other hand measuring actual production units using the alignment technique takes time, requires sophisticated hardware and cannot be performed within the process chambers to monitor the process in real time.

PCT Patent Application No. WO 0012958 describes a measurement system known as TMS, which uses wide spot light beams reflected from within layers of a patterned device surface to make measurements of the lateral variation of thickness of transparent layers and in particular $SiO_2$ layers. Unlike existing methods it can be used even over a heavily patterned area of a wafer such as that shown in FIG. 1c. The reflectance coefficient is transformed typically into the frequency domain from which it is possible to determine $SiO_2$ layer physical parameters by separating information relating thereto from information coming from layers having different parameters.

A disadvantage with the TMS method is that there is a limit to the resolution of the measurements. As wafer layers get smaller it is more difficult to resolve between the layers using TMS, and higher resolution accuracies require more intensive calculation. The more intensive calculation undermines the principle advantage of TMS, which is that it is able to work in real time.

SUMMARY OF THE INVENTION

According to a first aspect of the present invention there is thus provided a thickness measurement apparatus for measuring layer thicknesses on patterned areas of a semiconductor wafer, the apparatus comprising:

a spectrum analyzer for obtaining reflection data taken from a patterned area and obtaining therefrom a frequency spectrum, a peak detector, associated with the spectrum analyzer, for searching the spectrum to find peak frequencies within the spectrum, the peak detector being operable to restrict the search to regions corresponding to peak frequencies found in a learning stage, a frequency filter, associated with the peak detector, for filtering the spectrum about the peak frequencies, and a maximum likelihood fitter for using parameters obtained in the learning stage to carry out maximum likelihood fitting of the filtered spectrum to obtain at least the layer thicknesses.

Preferably, the reflection data is obtained from polychromatic light irradiation of the patterned area.

Preferably, the spectrum analyzer comprises aspectrometer, a dispersion corrector, a wave number transformer and a Fourier transformer.

Preferably, the peak frequencies found in the learning stage correspond to layer thicknesses of an initial sample.

Preferably, the layer thicknesses of the initial sample are determined in the learning stage by using spectral analysis to construct a spectrum at a higher resolution than that obtained by the spectrum analyzer.

Preferably, the frequency filter is operable to find minima on either side of each peak and to carry out filtering for each peak by filtering a range defined by the minima.

According to a second aspect of the present invention there is provided a thickness measurement apparatus for measuring layer thicknesses on patterned areas of a semiconductor wafer, the apparatus comprising:

a) an input spectrum analyzer for obtaining a reflection spectrum from respective patterned areas of semiconductor wafers, b) a learn mode unit comprising:

a peak detector, associated with the spectrum analyzer, for searching the spectrum to find peak frequencies within the spectrum, the peak detector being operable to restrict the search to regions corresponding to expected thicknesses of layers in the patterned areas, a frequency filter, associated with the peak detector, for filtering the spectrum about the peak frequencies, a high resolution spectrum analyzer for obtaining parameters from the filtered spectrum for use in maximum likelihood fitting, and a maximum likelihood fitter for using the parameters to carry out maximum likelihood fitting of the filtered spectrum to obtain learn mode layer thicknesses; and c) a run mode unit comprising:

a peak detector, associated with the spectrum analyzer, for searching the spectrum to find peak frequencies within the spectrum, the peak detector being operable to restrict the search to regions corresponding to peak frequencies found by the learn mode unit, a frequency filter, associated with the peak detector, for filtering the spectrum about the peak frequencies, and a maximum likelihood fitter for using the parameters obtained by the learn mode unit to carry out maximum likelihood fitting of the filtered spectrum to obtain the layer thicknesses.

Preferably, the high resolution spectrum analyzer is operable to obtain the parameters by constructing a new spectrum at a resolution higher than a resolution obtained by the input spectrum analyzer.

According to a third aspect of the present invention, there is provided a method for measuring layer thicknesses on patterned areas of a semiconductor wafer, the method comprising:

obtaining reflection data taken from a patterned area, obtaining therefrom a frequency spectrum, searching the spectrum to find peak frequencies within the spectrum the search being restricted to regions corresponding to peak frequencies found in a learning stage, filtering the spectrum about the peak frequencies, and using parameters obtained in the learning stage to carry out maximum likelihood fitting of the filtered spectrum to obtain the layer thicknesses.

Preferably, the reflection data is obtained from polychromatic light irradiation of the patterned area.

Preferably, obtaining the frequency spectrum comprises measuring the spectrum of the reflection data, correcting for dispersion, transforming for wave number and carrying out Fourier transforming.

Preferably, the peak frequencies found in the learning stage correspond to layer thicknesses of an initial sample.

Preferably, the layer thicknesses of the initial sample are determined in the learning stage by using spectral analysis to construct a spectrum at a higher resolution than that obtained by the spectrum analyzer.

Preferably, the filtering the spectrum comprises finding minima on either side of each peak and carrying out filtering for each peak over a range defined by the minima.

According to a fourth aspect of the present invention there is provided a method for measuring layer thicknesses on patterned areas of a semiconductor wafer, comprising:

a) a stage of obtaining a reflection spectrum from respective patterned areas of semiconductor wafers, b) a learning stage comprising:

searching the spectrum to find peak frequencies within the spectrum, whilst restricting the search to regions corresponding to expected thicknesses of layers in the patterned areas, filtering the spectrum about the peak frequencies, obtaining parameters from the filtered spectrum for use in maximum likelihood fitting, and using the parameters to carry out maximum likelihood fitting of the filtered spectrum to obtain learn mode layer thicknesses; and c) a run stage comprising:

searching the spectrum to find peak frequencies within the spectrum, whilst restricting the search to regions corresponding to peak frequencies found in the learning stage, filtering the spectrum about the peak frequencies, and using the parameters obtained in the learning stage to carry out maximum likelihood fitting of the filtered spectrum to obtain the layer thicknesses.

Preferably, the stage of obtaining parameters from the filtered spectrum for use in maximum likelihood fitting comprises constructing a higher resolution version of the obtained reflection spectrum.

According to a fifth aspect of the present invention there is provided apparatus for controlling a semiconductor wafer production line, the production line having a plurality of stations, successive stations being for carrying out successive processes on wafers to add features to the wafers, at least one of the stations having a measuring unit for providing measurements of layers on a patterned surface part of a respective wafer, the measuring unit comprising:

a spectrum analyzer for obtaining reflection data taken from a patterned area and obtaining therefrom a frequency spectrum, a peak detector, associated with the spectrum analyzer, for searching the spectrum to find peak frequencies within the spectrum, whilst restricting the search to regions corresponding to peak frequencies found in a learning stage, a frequency filter, associated with the peak detector, for filtering the spectrum about the peak frequencies, and a maximum likelihood fitter for using parameters obtained in the learning stage to carry out maximum likelihood fitting of the filtered spectrum to obtain the layer thicknesses.

Preferably, the reflection data is obtained from polychromatic light irradiation of the patterned area.

Preferably, the spectrum analyzer comprises a spectrometer, a dispersion corrector, a wave number transformer and a Fourier transformer.

Preferably, the peak frequencies found in the learning stage correspond to layer thicknesses of an initial sample.

Preferably, the layer thicknesses of the initial sample are determined in the learning stage by using spectral analysis to construct a spectrum at a higher resolution than that obtained by the spectrum analyzer.

Preferably, the frequency filter is operable to find minima on either side of each peak and to carry out filtering for each peak by filtering a range defined by the minima.

Preferably, the measuring units are located to take thickness measurements before, during and after processing at a given station. The thickness measurements may then be used to provide control for the wafer production process.

According to a sixth aspect of the present invention there is provided apparatus for controlling a semiconductor wafer production line, the production line having a plurality of stations, successive stations being for carrying out successive processes on wafers to add features to the wafers, at least one of the stations having a measuring unit for providing measurements of layers on a patterned surface part of a respective wafer, the measuring unit comprising:

a) an input spectrum analyzer for obtaining a reflection spectrum from respective patterned areas of semiconductor wafers, b) a learn mode unit comprising:

a peak detector, associated with the spectrum analyzer, for searching the spectrum to find peak frequencies within the spectrum, whilst restricting the search to regions corresponding to expected thicknesses of layers in the patterned areas, a frequency filter, associated with the peak detector, for filtering the spectrum about the peak frequencies, a high resolution spectrum analyzer for obtaining parameters from the filtered spectrum for use in maximum likelihood fitting, and a maximum likelihood fitter for using the parameters to carry out maximum likelihood fitting of the filtered spectrum to obtain learn mode layer thicknesses; and c) a run mode unit comprising:

a peak detector, associated with the spectrum analyzer, for searching the spectrum to find peak frequencies within the spectrum whilst restricting the search to regions corresponding to peak frequencies found by the learn mode unit, a frequency filter, associated with the peak detector, for filtering the spectrum about the peak frequencies, and a maximum likelihood fitter for using the parameters obtained by the learn mode unit to carry out maximum likelihood fitting of the filtered spectrum to obtain the layer thicknesses.

Preferably, the high resolution spectrum analyzer is operable to obtain the parameters by constructing a new spectrum at a resolution higher than a resolution obtained by the input spectrum analyzer.

Preferably, the measuring units are located to take thickness measurements before, during and after processing at a given station. The measurements may then be used to provide control of the process.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 is a simplified ray diagram illustrating how light reflection can be used to obtain information of layer thicknesses in a layered wafer product using the TMS system, FIG. 3 is a simplified block diagram showing a two-part layer thickness measurement apparatus according to a first preferred embodiment of the present invention.

DESCRIPTION OF THE PREFERRED EMBODIMENTS

Figure 1A:
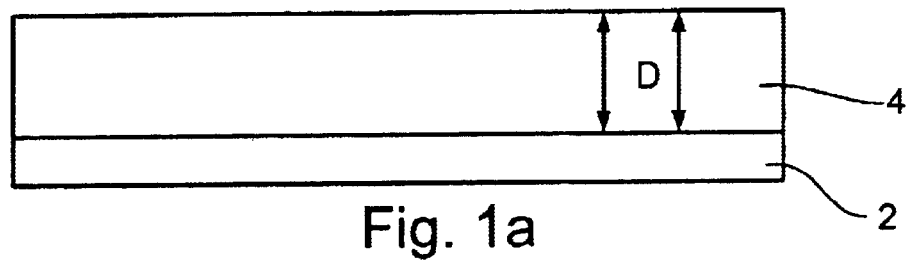
FIG. 1A is a simplified diagram of a layered product wafer wafer product without any pattern.

The present embodiments describe a two-stage system, which uses the TMS system of PCT Patent Application No. WO 0012958, the contents of which are hereby incorporated by reference in their entirety. In the first, learning, stage a TMS-based layer characterization of a typical sample of a semiconductor wafer product is made for a given stage of manufacturing. This stage is carried out as accurately as possible using such techniques as estimation of high resolution spectra than that originally taken. Such techniques are highly calculation intensive and thus not currently suitable for real time processing. The estimation of high-resolution spectrum is used to produce starting points for maximum likelihood fitting. In a second stage, measurements of actual semiconductor products reaching the given stage are taken and deviations of the layer thicknesses vis a vis the sample are determined. The second stage also uses maximum likelihood fitting, however, in the second stage the maximum likelihood estimation is seeded by parameters obtained from the first stage. Thus, in the second stage, the high-resolution estimation of the first stage is preferably preserved even though the resources needed for calculation are preferably reduced.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

As an introduction to the present invention, the TMS measurement method of PCT Patent Application No. WO 0012958 is discussed in detail.

Reference is now made to FIG. 1A, which is a simplified diagram showing a cross-section of a silicon wafer at an intermediate stage in the production process. A silicon wafer 2 has a photoresist layer 4 attached thereon. In FIG. 1A the photoresist layer 4 is uniform and a simple measurement is all that is necessary to determine the thickness D of the layer.

Figure 1B:
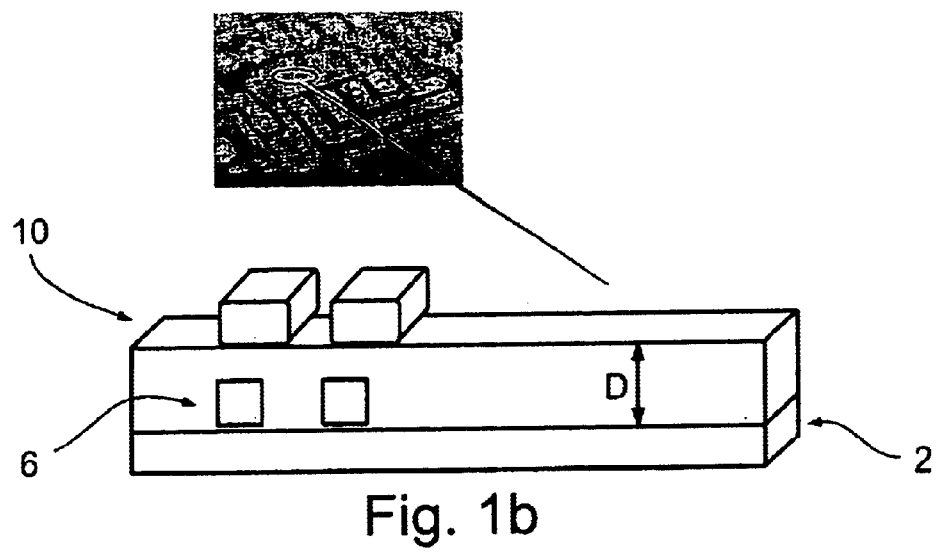
FIG. 1B is a simplified diagram of the layered product wafer with underlying patterns such as metal lines. The wafer further having a non-patterned area on which conventional methods of thickness measurements may still be performed.

Reference is now made to FIG. 1b, which is a simplified diagram showing the silicon layer at a further intermediate processing stage in which patterning begins to be applied to supply features to the chip. More specifically, metal structures 6 are covered by a Silicon Dioxide ($SiO_2$) layer 10. As illustrated, a spot can be selected on the non-patterned part of the surface and, again only a simple measurement needs to be taken in order to obtain thickness D.

Figure 1C:
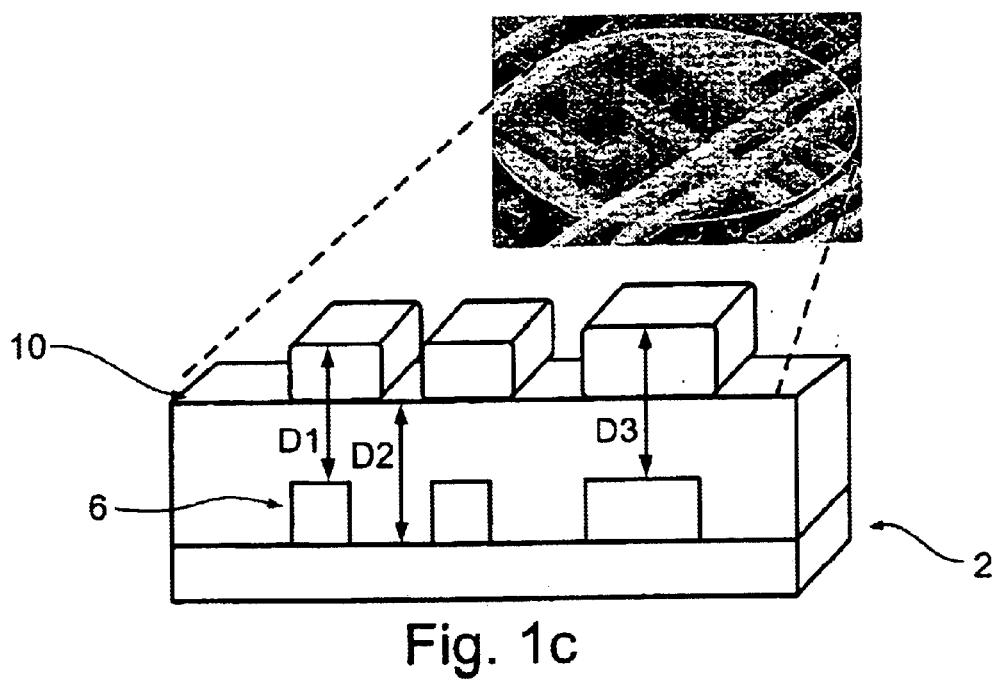
FIG. 1C is a simplified diagram of a layered wafer similar to that of FIG. 1B but with pattern introduced throughout the wafer, and showing measurements being performed on the patterned areas.

Reference is now made to FIG. 1c, which is a simplified diagram showing a cross section of another silicon wafer at another intermediate stage in the production process. In FIG. 1c the wafer 2 comprises a series of metal line structures 6, covered by $SiO_2$ layer 10. The TMS measurement system, as will be explained in more detail below, is particularly suitable for measuring the thickness of a transparent or semi-transparent film. In the present case the $SiO_2$ layer 10 has differences in thickness at different places due to the metal line structures 6. There may thus be identified three different layer thickness $D_1$–$D_3$ in a typical wafer. The above differences in thickness are not accurately measurable in a conventional measurement system. The TMS system however, is capable of measuring such thickness variations in wafer layers that are applied or layers that have been removed, and furthermore the measurement is in situ and, up to a certain resolution limit, in real-time. The following description of the basic theory of operation of the TMS process will be helpful in understanding how this may be achieved.

Reference is now made to FIG. 2, which is a simplified ray diagram showing incidence of light at an angle onto a series of layers having different refractive indices.

In FIG. 2, a material comprising three transparent layers, 0, 1, and 2, are subjected to radiation by a beam of light. An incident ray 12 strikes a first layer boundary 14 to be split into a reflected ray 16 and a refracted ray 18. The refracted ray 18 strikes a second layer boundary 20 and is again split. This time only the reflected ray 22 is shown. As the refracted ray 22 strikes the first boundary 14 it is refracted again to comprise a third refracted ray 24.

Several methods are known for measuring thickness of transparent films using a reflection pattern obtained using multi-wavelength light. When the beam shown in FIG. 2 is a monochromatic (single wavelength) light beam, and it arrives at a transparent film, part of the beam is reflected from the upper face (Layer 0/Layer 1 interface), and part is reflected from the bottom face (Layer 1/Layer 2 interface).

Expressing mathematically what is shown in FIG. 2:

$\lambda$ is the wavelength of the light;

$\phi_o$ is the phase angle of the incident light (and of the light reflected from the Layer 0/Layer 1 interface):

$\phi_o+\phi_1$ is the phase angle of the light reflected from the Layer1/Layer 2 interface;

$r_{01}$ is the Fresnel reflection coefficient of the Layer 0/Layer1 interface;

$r_{12}$ is the Fresnel reflection coefficient of the Layer 1/Layer 2 interfaces; and $t_{01}$ is the Fresnel transmission coefficient of the Layer 0/Layer1 interface;

$t_{10}$ is the Fresnel transmission coefficient of the Layer 1/Layer 0 interfaces;

I is the intensity of the incident light $$I=I_0 \cos(2\pi ct/\lambda+\phi_o) \quad (EQ. 1)$$

where $I_0$ is the maximum intensity amplitude and c is the speed of light.

For light arriving perpendicularly at the film surface, the reflection coefficients from the top and bottom surfaces are:

$$r_{01}=(n_1-n_0)/(n_1+n_0) \quad (EQ. 2a)$$

$$r_{12}=(n_2-n_1)/(n_2+n_1) \quad (EQ. 2b)$$

$$t_{01}=2n_0/(n_1+n_0) \quad (EQ. 2c)$$

$$t_{10}=2n_1/(n_1+n_0) \quad (EQ. 2d)$$

wherein $n_0$, $n_1$, $n_2$ are the refractive indices of layers 0, 1 and 2, respectively.

The light reflected from the upper face interferes with the light reflected from the bottom face, giving an overall reflection coefficient (R) which is a function of the layer thickness and the layer refractive index. This reflection can be described by the well-known Frenel equation, as follows:

$$R=(r_{01}^2+r_{12}^2+2r_{01}r_{12} \cos 2\Phi_1)/(1+r_{01}^2r_{12}^2+2r_{01}r_{12} \cos 2\Phi_1) \quad (EQ. 3)$$

where:

$$\Phi_1=2\pi n_1 d_1/\lambda \quad (EQ. 4)$$

where:

$d_1$—layer thickness.

Illuminating the film with multi-wavelength light (white light), and measuring the reflectance at each wavelength ($\lambda$), gives R as a function of $\lambda$, i.e., R($\lambda$).

Illuminating a product wafer having a complex (i.e. laterally varying) topography with a large spot of multi-wavelength light causes a reflected beam which is a composition of the separate reflection of each of the thicknesses taken alone.

$$R(\lambda, d_1, \ldots, d_n)=\Sigma_i(r_{(i-1),i}^2+r_{i(i+1)}^2+2r_{(i-1),i}r_{i(i+1)} \cos 2\Phi_i)/(1+r_{(i-1),i}^2r_{i(i+1)}^2+2r_{(i-1),i}r_{i(i+1)} \cos 2\Phi_1) \quad (EQ. 5a)$$

It is noted that eq. 5 applies to the multi-layered case. For the lateral case, that is in the case of lateral variations in thickness, it is possible to write $$R(\lambda, d_1, \ldots, d_n)=\Sigma_i R(\lambda, d_i) \quad (EQ. 5b)$$

By simple mathematical operations it is possible to express the reflection coefficient by:

$$R(\lambda, d_1, \ldots, d_n)=\Sigma_i[1-A_i/(1+B_i \cos(2\Phi_i))]*G_i \quad (EQ. 6)$$

where:

$$A_i=(1-r_{(i-1),i}^2)(1-r_{i(i+1)}^2)/(1+r_{(i-1),i}^2r_{i(i+1)}^2); \quad (EQ. 6a)$$

$$B_i=2r_{(i-1),i}r_{i(i+1)}/(1+r_{(i-1),i}^2r_{i(i+1)}^2) \quad (EQ. 6b)$$

and $G_i$ is a factor describing a relative contribution of given layer with thickness di to the total reflection of the multi-thickness structure.

Applying any one of a number of methods of frequency decomposition of the reflection coefficient may provide each of the arguments ($\Phi_i$), and from Eq 3 & 4 it is possible to determine the layer thickness, assuming that the layer refractive index is known. Alternatively it is possible to determine the layer refractive index, if the layer thickness is known.

There are several ways to perform frequency decomposition, some of which are suggested below:

Mathematical Decompositions

1) The family of orthogonal transform methods, for example Fourier transforms,

2) The family of methods based on the maximum likelihood principle,

3) The family of methods based on parametric models

4) The family of subspace decomposition methods.

Electrical Decomposition

Electrical frequency filters are widely used in electrical and electronic systems. Such filters serve to define windows in the frequency domain and output the amplitude of the component of the input signal within the range of the window. Passing the reflected signal (translated into an electrical signal) through a set of filters or a single filter with variable frequency gives the desired decomposition.

Each of the above methods, the listed mathematical methods and electrical decomposition, when used separately has its own limitations in the context of a practical environment such as that of a silicon chip production line. The orthogonal transforms and in particular the Fourier transform, are quick and easy to use but are limited in the resolution level provided. A well known relationship, the Rayleigh limit states that Fourier transformation performed on finite argument T1 . . . Tn has a minimal frequency resolution of $Df_{min}=1/(Tn-T1)$. In cases where light is in the V-visible range, say white light from 300 nm to 1000 nm, and dielectric layers are for example $SiO_2$ having a refractive index of 1.45, the minimal thickness resolution is about 148 nm, which in some cases is not sufficient for levels of lateral thickness variation that it is desired to control.

The methods using maximum likelihood principle involves fitting the reflected coefficient data to theoretical reflectance coefficients using the number of layers and physical parameters (d, n and k) as variables and changing those variables until a best fit is achieved. In an actual production line, the necessary prior knowledge of the relevant variables is likely to be limited and can be found only by extensive analysis, which may be destructive of the sample being tested. Without prior knowledge of the variables the fitting algorithm is too complicated to give an accurate result, takes a long time to calculate and in some cases may lead to invalid results. Thus maximum likelihood based methods are impractical for the kind of real time measurement needed for process monitoring and control.

Comparing the parametric model based methods against subspace decomposition, the latter gives a better spectral resolution. On the other hand the respective computational costs are approximately equal. Moreover, the parametric model methods available are principally for stochastic type signals. By contrast the kinds of signal being considered in the present invention are typically deterministic and sinusoidal in form. (see EQ. 3).

The methods of sub-space decomposition are in general dedicated to spectral analysis of independent signal sources. Unfortunately it is not true to say that in wafer layer structures the signal sources, namely the layer boundaries really qualify as independent sources. It is true that each layer boundary gives rise to its own signal. For example in the deposition of a dielectric layer on top of a metal line pattern, the thickness of the dielectric on top of the metal line and the dielectric thickness between the metal lines are two different thicknesses which have to be treated separately, but they are not independent of each other because a change in the deposition layer thickness changes both of them together. Despite the above disadvantages, if carried out correctly on suitable data, sub-space decomposition techniques can separate layers with much better resolution than the Fourier transformation. However the limitations inherent in the production line environment, and the problem of sub-space mixing, limit the accuracy and stability of the results. As a rule, sub-space decomposition methods, when used for measuring wafer thicknesses, tend to give results with a systematic shift.

Reference is now made to FIG. 3, which is a simplified diagram showing a two stage measuring system according to a preferred embodiment of the present invention. A learn mode unit 30 performs Fourier analysis, high resolution analysis and maximum likelihood fitting of TMS results and is arranged in association with a run mode unit 32 which carries out Fourier analysis and maximum likelihood fitting on real time TMS results. As mentioned above, the principle difficulty of using maximum likelihood methods is in obtaining initial values for the fitting process. Thus the present embodiment carries out non-real time analysis of a sample and the results of the non-real time analysis are used as starting points for real time maximum likelihood fitting. In learn mode, a high resolution spectrum is constructed, preferably by sub-space decomposition methods, as will be explained below, to obtain a starting point for maximum likelihood fitting. The method finds very precise results from a set of trial samples, and the results are then used as parameters for seeding a real time measuring mode, which involves a maximum likelihood process, but without calculating the high resolution spectrum. The learn mode thus obtains accurate thickness data from a set of trial samples, the sample being fully reflective of the process. The learn mode is preferably carried out each time a new pattern structure is made, whenever a different material is introduced or whenever a different thickness range is introduced, so that it is always fully reflective of the process. The learn mode results are then preferably stored in computer memory under a label specified for the type of product, process type and material.

The run mode unit 32 is subsequently used for real time analysis each time a measurement is required to control the layer deposition process. The run mode uses the data from the 'learn mode' as the initial parameters or initial estimates to seed a maximum likelihood based process, and continues the calculations until final results are achieved. The system thus overcomes the disadvantages of both the maximum likelihood and high resolution (sub-space decomposition) methods as outlined above. Since very precise prior knowledge is obtained from the learn mode, maximum likelihood estimation is able to provide stable and accurate results in real time.

In the following figures, the learn and run phases are considered in greater detail.

1) Learn Mode

Figure 4:
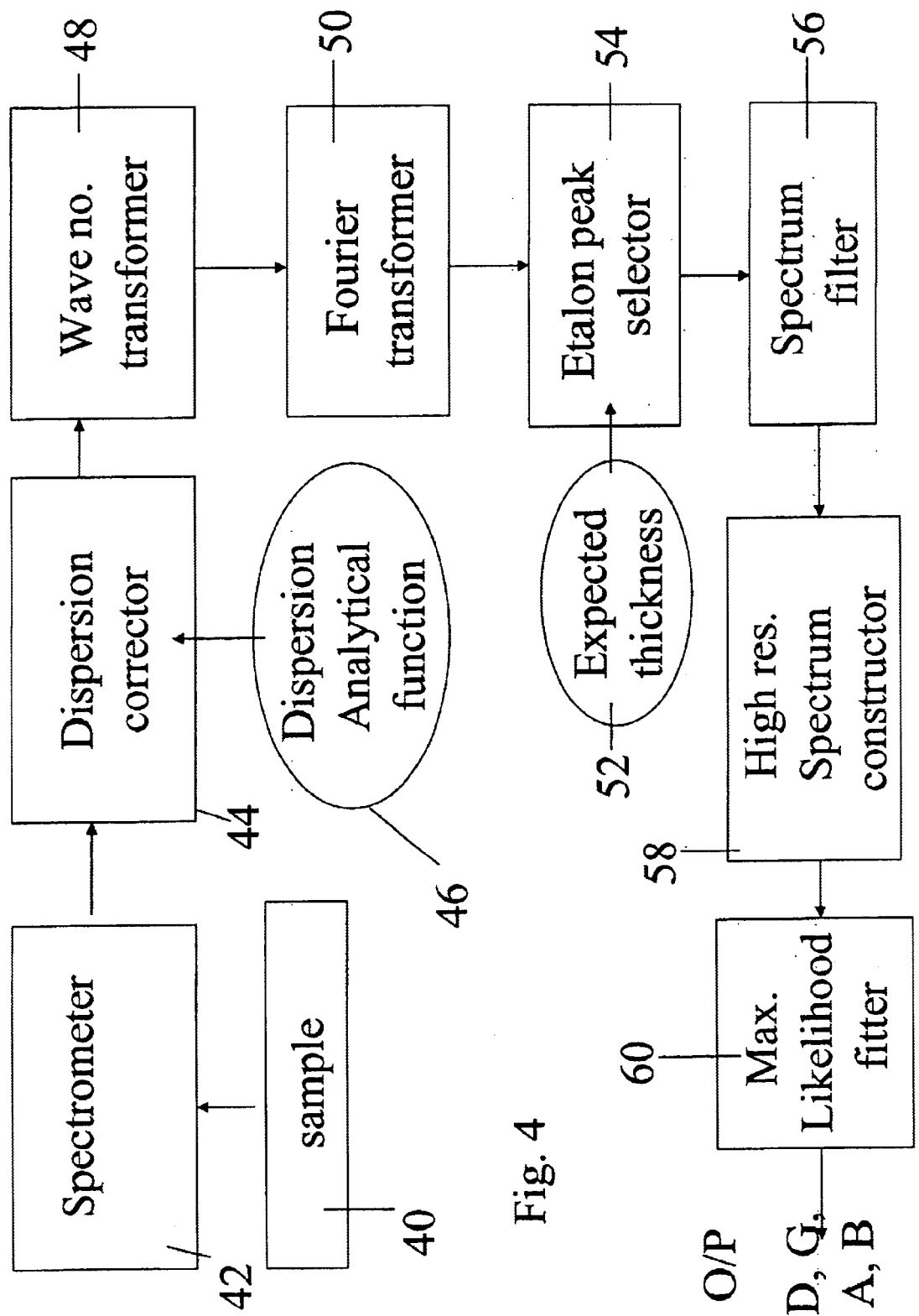
FIG. 4 is a simplified block diagram showing in greater detail the learn mode unit of FIG. 3.
Figure 5:
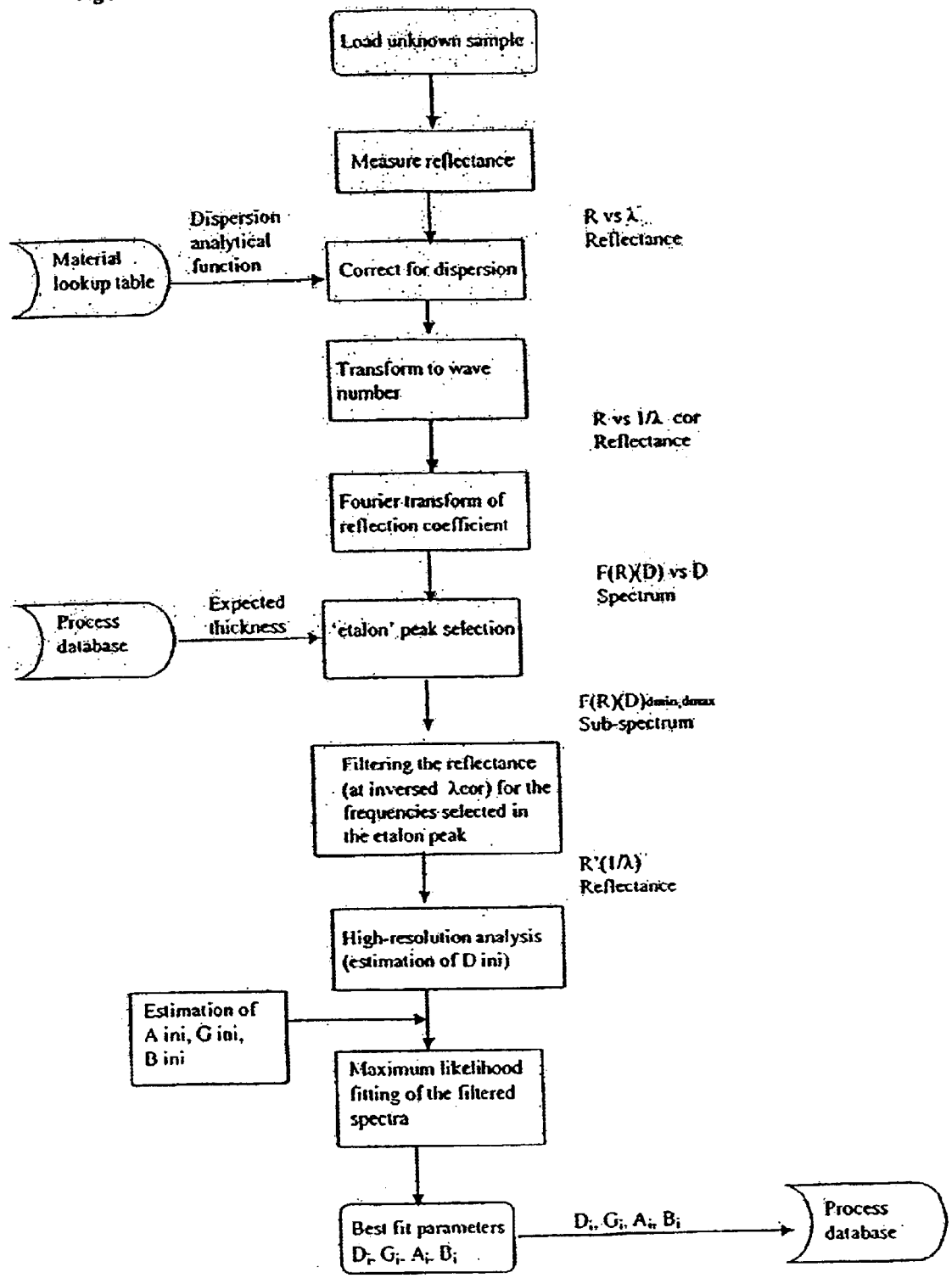
FIG. 5 is a simplified flow chart showing a learn mode process for use with the learn mode unit of FIG. 3.

Reference is now made to FIG. 4, which is a simplified block diagram showing apparatus according to a preferred embodiment of the present invention for carrying out the learn mode as described above. Reference is made at the same time to FIG. 5, which is a flow chart showing the procedure involved in the learn mode.

The first part of the operation is the same in both learn and run modes.

In both cases an initial spectrum is taken of the patterned surface of the sample 40, by spectrometer 42.

Using a priory data of the layer refractive index, a correction of the wavelength axis using the refractive index dispersion $(N[\lambda(i)])$ is carried out at dispersion corrector 44, which is connected downstream of the spectrometer 42. The correction is preferably preformed by analytical formulae depending on the type of layer material to yield:

$$\lambda cor(i)=\lambda(i)/N[\lambda(i)], \text{ where } i=1:n.$$

where λcor(i) is the corrected wavelength,
λ(i) is the i$^{th}$ wavelength, and
N[λ(i)] represents the dispersion function for refractive index N at wavelength λ. The signal, which is now uniform in the corrected wavelength λcor is preferably transformed using linear interpolation to be uniform in x=2π/λcor. The transformation is carried out at wave number transformer 48 which is connected downstream of the dispersion corrector 46.

The wave number transformer 48 is connected to a Fourier transform unit 50 which performs a Fourier transform on the reflection coefficient y=R(x) to give $$S(f)=FT[y]$$

Values 52 of expected thicknesses 52 are defined based on previous knowledge of the application and on the specific process and product. By contrast with the subsequent run mode the expected values are not likely to be especially accurate.

Connected downstream of the Fourier transform unit is Etalon peak selector 54. As will be recalled the TMS signal includes peaks which correspond to layer boundaries, and the "Etalon" spectral peak is a name assigned to the significant peak in the transformed signal which is the nearest to the frequency value corresponding to the respective expected thickness. The Etalon peak selector 52 uses the expected thickness to arrive at a starting point within the signal and from there finds the Etalon peak.

A coefficient for use in transformation between the thickness and frequency may be defined from the following identity:

$$\text{Thickness}=0.5*n/(1/\lambda\min - 1/\lambda\max)*\text{Frequency}$$

where n is the number of points in the signal;
λmin, λmax are minimal and maximal wavelengths of the corrected wavelengths λcor respectively
the coefficient therefore being:

$$0.5*n/(1/\lambda\min - 1/\lambda\max)$$

An array may be drawn up of all of the Etalon peaks that have been identified in the transformed signal. Such an array is referred to herein as "VecPeak" and it represents all the thicknesses that contribute to the reflection pattern from the wafer.

Downstream of the Etalon peak selector 54 is a spectrum filter 56. The purpose of the spectrum filter is to find the frequency bounds for the various spectral or etalon peaks surrounding the expected thicknesses. Preferably the frequencies bounds are obtained by finding frequencies that bound of the etalon frequency peak corresponding to the expected thickness.

The original signal with corrected argument (R(λcor)) is then filtered by the spectrum filter 56 to leave only the etalon peak part of the signal as it lies within the boundaries found above.

Figure 6:
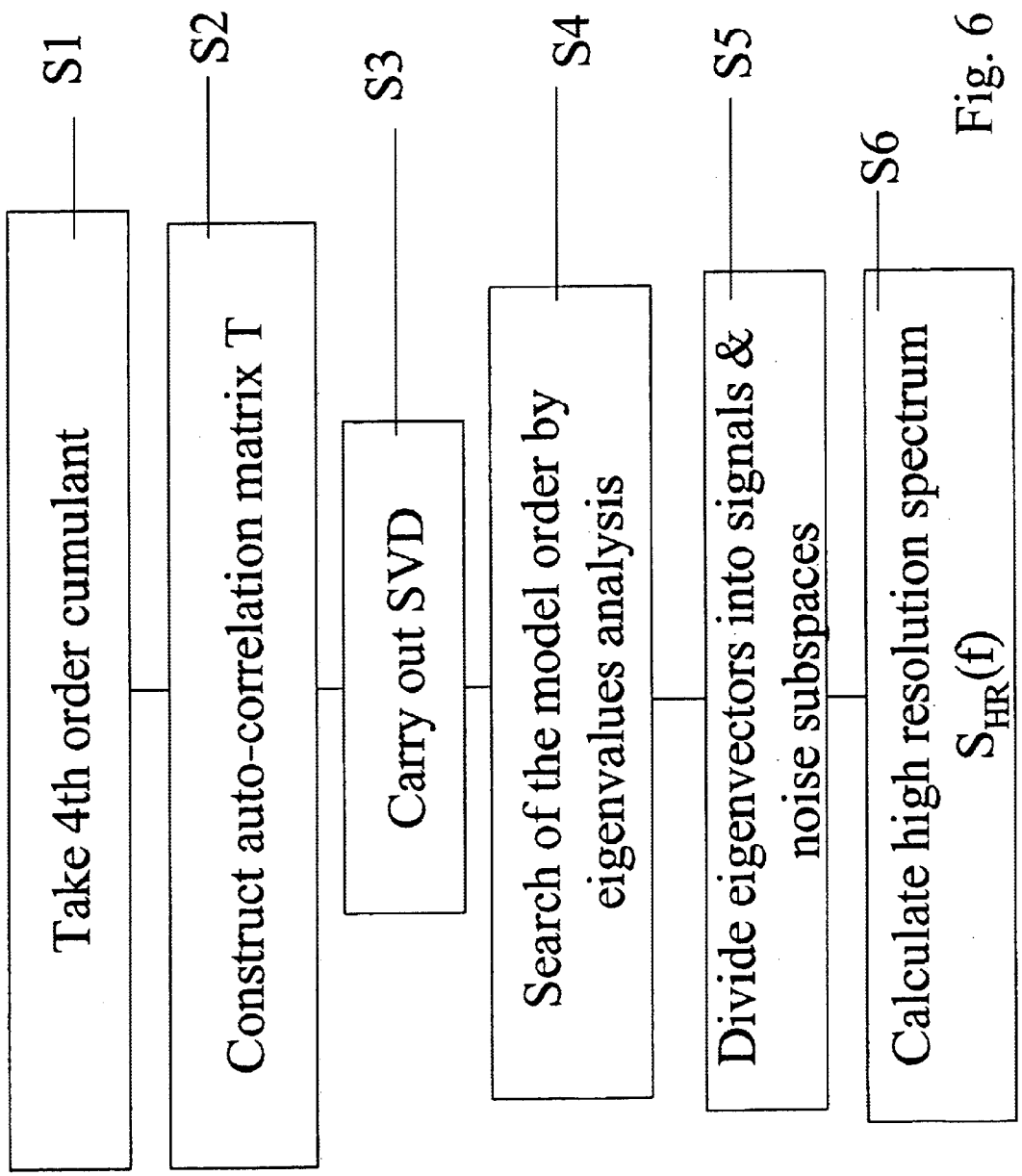
FIG. 6 is a simplified flow chart showing a process for calculating a high resolution spectrum in the learn mode.

The spectrum filter 56 is followed by a high resolution spectral analyzer 58, also referred to herein as a high resolution spectrum constructor. The filtered spectral signal now enters a mathematical process for deriving a spectrum that has a higher resolution than the initial input spectrum. The high resolution spectral analysis is illustrated in FIG. 6, which is a simplified flow chart showing the stages of the analysis for producing the high resolution spectrum.

In a first stage S1, a fourth order cumulant is taken of the filtered signal.

For the given signal an auto-correlation matrix (T) is constructed from the forth order cumulant in a stage S2.

Following formation of the autocorrelation matrix, SVD (Singular Value Decomposition) is carried out of the autocorrelation matrix in a stage S3, thus $$T=U*E*V^+,$$

where T is the autocorrelation matrix as above;
E is the diagonal matrix of the eigenvalues of the autocorrelation matrix in descending order;
U is the matrix of corresponding eigenvectors of the matrix T; V$^+$ is the conjugate and transposed matrix of V;
V is the matrix of corresponding eigenvectors of T'; and
T' is the transposed matrix of T.

In the above procedure a stage S4 finds a model order (p), which is a quantity equal to the number of the biggest eigenvalues The procedure searches for an eigenvalue that differs markedly from the eigenvalues immediately following, thus (E(p,p)>>E(p+1,p+1)). The model order as defined above is thus able, in stage S5, to divide associated eigenvectors into two groups namely the eigenvectors spanning the signal subspace Us and the eigenvectors spanning the orthogonal noise subspace Un: U={Us| Un}. In stage S6, a high resolution spectrum is created as follows:

for obtained model order p and data set a high resolution spectrum is calculated as follows:

$$S_{HR}(f)=1/[W(f)*W(f)*],$$

where W(f) is the transform Fourier of a vector w for frequency f;
where w={1|(1−up×up$^T$)$^{-1}$Up*×up};
up and Up are the first row-vector, and the rest of the matrix Us respectively.
the subscript "*" denotes conjugating vector or matrix;
the subscript "$^T$" denotes transposing vector or matrix.
The locations of maximums of S$_{HR}$(f) may now be considered as initial thickness values (Dini).

Returning now to FIG. 4 and downstream of the high resolution spectrum analyzer 58 is a maximum likelihood fitter 60. The fitter uses the initial thickness values (Dini) to fit the filtered data sets to the curve defined by equation (6).

Figure 7:
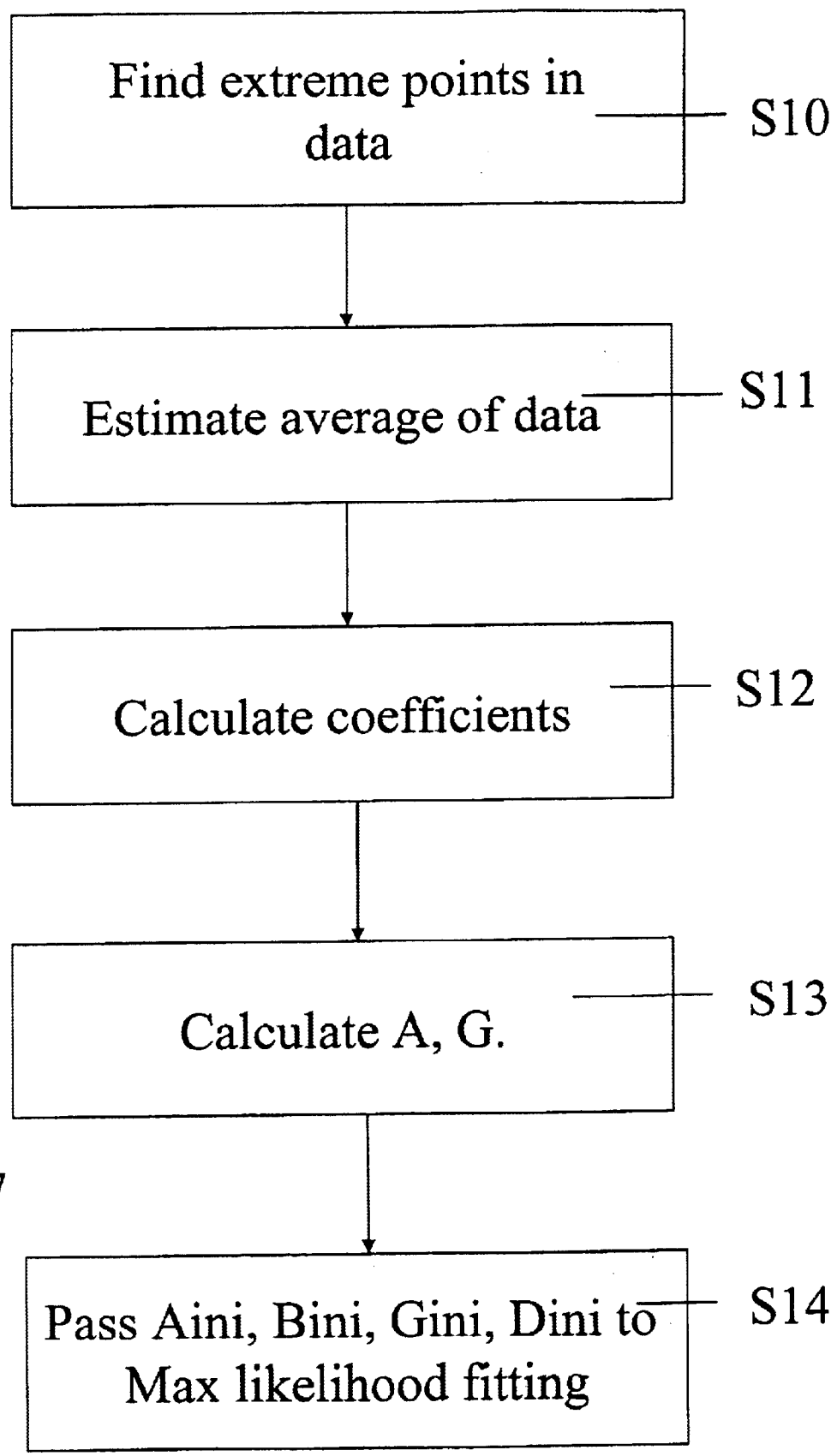
FIG. 7 is a simplified flow chart showing a method of maximum likelihood fitting for both the learn and run modes.

Further parameters Gini, Aini and Bini are obtained by a pre-estimating procedure The fitting procedure preferably uses an approximation 1/(1+z)~1−z for equation (6) and obtains an analytical decision for initial parameters according to the following sequence of operations, as illustrated in FIG. 7:

Firstly S10 a search is carried out to determine coordinates of extreme points xExt(m), yExt(m) in the measured data;

Secondly S11, an estimate is made of an average over the data yAver;

Thirdly S12, a calculation is made of coefficients for the system:

$$Cn=V \times z, \qquad (\text{EQ. 7})$$

where Cn=yExt(m)−yAver;
and V={V1|V2|V3 . . . }—is a system matrix, which consists of column-vectors Vi defined by:

$$Vi=\begin{cases} y\text{Aver}\times\cos\,[4\pi\times x\text{Ext}(m)\times D(nD)] \text{ for } i=1; \\ \cos\,[4\pi\times x\text{Ext}(m)\times D(i-1)]-\cos\,[4\pi\times x\text{Ext}(m)\times D(nD)] \text{ for } i=2:nD, \end{cases}$$

nD is the number of searched thicknesses (Dini)
The system determines, from equation (7); that $$z = V^{-1} \times Cn$$

and a determination of values A, G is made as follows in a step S13:

$$A_{ini} = z(1)/[z(1)+1];$$

$$G_{ini}(i) = \begin{cases} z(i+1)/A & \text{for } i = 2{:}nD-1; \\ \left[ z(1)_{x} yAver - \sum_{k=2{:}nD} z(k) \right] / A & \text{for } i = nD. \end{cases}$$

$$B_{ini} = \text{const.}$$

The parameters $A_{ini}$, $B_{ini}$, $G_{ini}$ and $D_{ini}$ estimated above are an initial guess for the maximum likelihood fitting. In turn, the results of this fitting comprise the results of the learning mode. The values of A, B, G and D that are determined are finally stored in a database 72 for each thickness found, in a stage S14.

2) Run Mode

Figure 8:
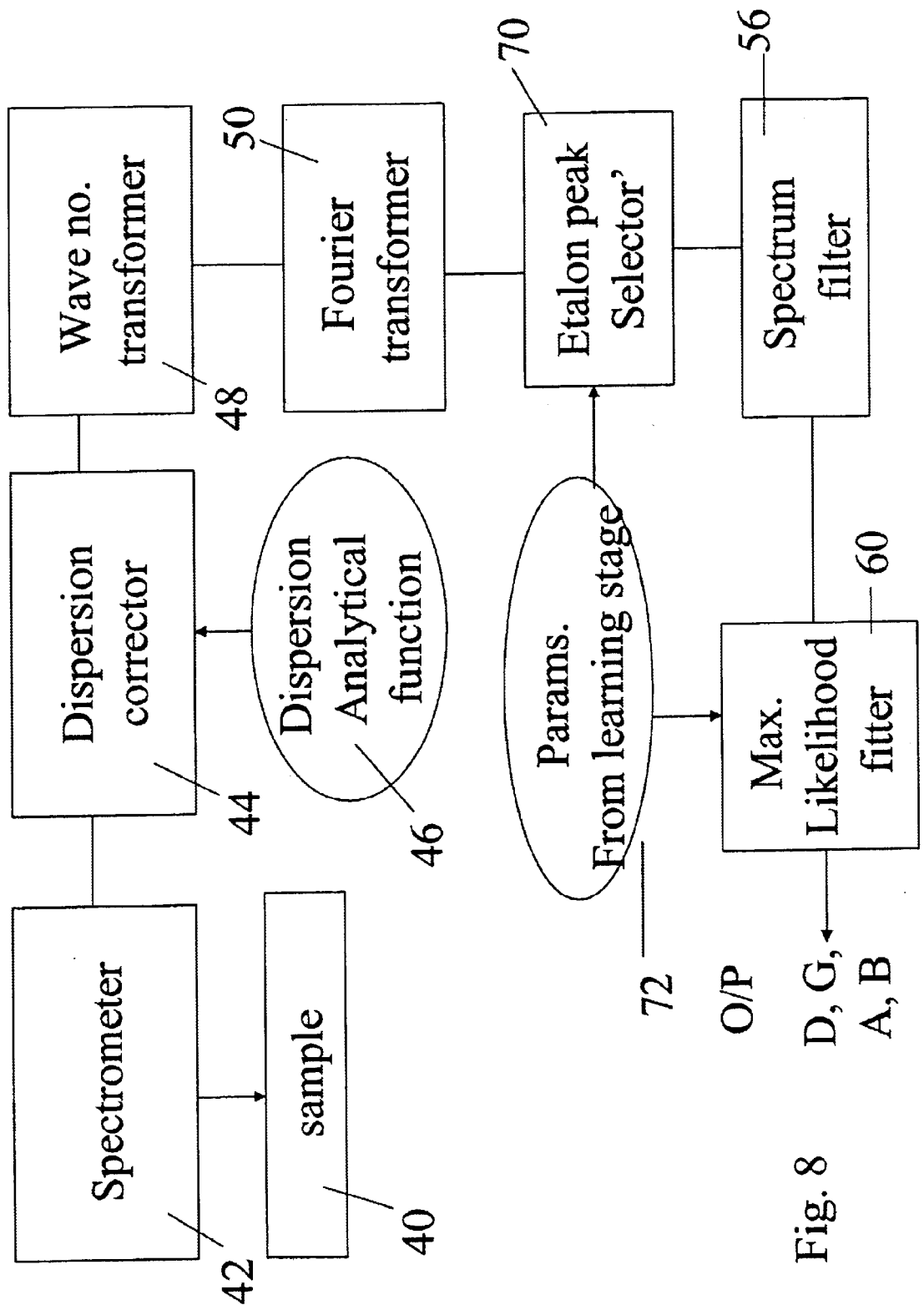
FIG. 8 is a simplified block diagram showing the run mode unit of FIG. 3 in greater detail.
Figure 9:
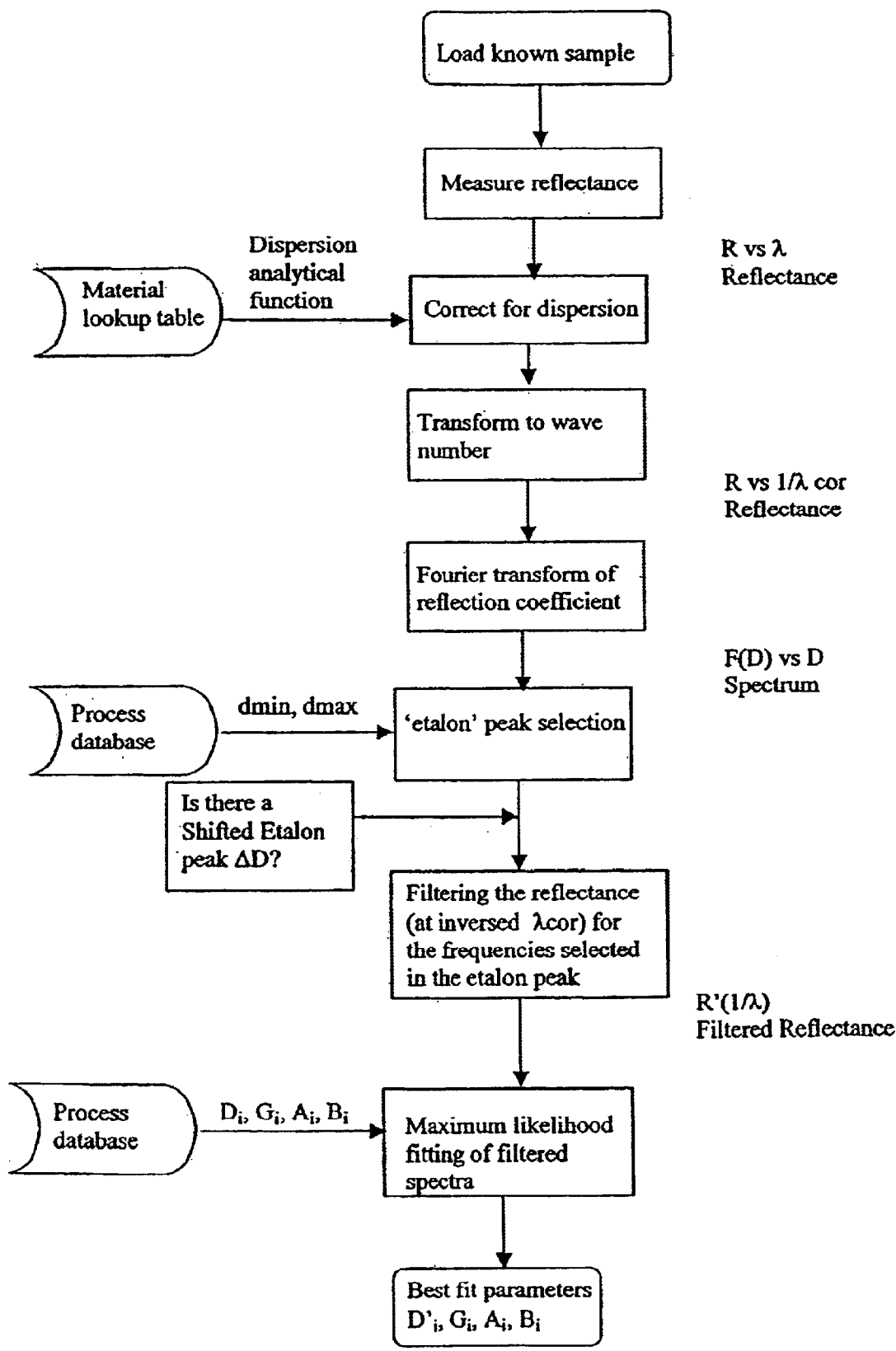
FIG. 9 is a simplified flow chart showing a procedure for use with the run mode unit of FIG. 8.

Reference is now made to FIG. 8, which is a simplified block diagram of the run mode unit 32 of FIG. 3. As will be apparent, the run mode unit is similar to but not the same as the learn mode unit 30.

The run mode unit 30 requires, for its operation, parameters obtained by the learn mode from a sample that has been through identical processing.

In run mode, as in the learning mode, a sample 40 is irradiated and reflection information is obtained and analyzed by spectrometer 42. Dispersion corrector 44 uses a dispersion analytical function 46 as before. Correction is carried out using parameters based on the type of material etc.

At wave no. transformer 48, transformation of the signal currently uniform in wavelength λ to one uniform in 2π/λ is carried out using linear interpolation.

As before, the signal is transformed into the frequency domain by Fourier transformer 50. However, when it comes to Etalon peak selector' 70, selection is carried out using as starting points the frequency bands (or thicknesses) 72 already obtained during the learning process, from which the actual Etalon peaks are found to produce the Etalon spectrum. Operation of Etalon peak selector' 70 is based on the assumption that the current thicknesses being measured may differ but not markedly so from the thicknesses found in the learning stage. Thus inspection over a small range around such an expected thickness should find an actual Etalon peak, which can be described in terms of the expected thickness and a shift ΔD. Thus the expected thickness is common to the given process, whereas the shift is a property of the individual wafer, and to a lesser extent of the individual thickness. It will be understood that it is possible that no discernable peak is detected at all, in which case the respective thickness and corresponding layer are presumed to be absent.

Subsequently, spectrum filter 56 may carry out bandpass filtering of the signal within the frequency band obtained by the learning process and subsequently corrected relative to the actual etalon spectrum.

In run mode there is no high-resolution spectrum analyzer. Instead the parameters needed for the fitting stage are taken directly from the data base 72 of the learn mode.

Finally, maximum likelihood fitter 60 carries out fitting as explained above in the learn mode, using the initial Gi, Ai, Bi found in the learn mode as optimization parameters and Di+ΔD corrected by the shift corrector procedure described above in connection with the Etalon peak selector.

When a best fit is achieved a final result for the various thicknesses Di and the area ratios Gi for the current sample are preferably stored as appropriate in the control system data base and/or sent to the output units of the system such as screen, host communication, process tool communication etc. so as to contribute to control of the process as desired.

There is thus achieved an accurate, high-resolution thickness measurement system that operates in real time and may be used to provide measurements for wafer production process control.

Whilst the preferred embodiments have been described as being used in wafer manufacture, it will be appreciated that the measurement system is applicable to any case where high-resolution real time thickness measurements of thin films or transparent or semi-transparent layers are needed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. Thickness measurement apparatus for measuring layer thicknesses on patterned areas of a semiconductor wafer, the apparatus comprising:

a spectrum analyzer for obtaining reflection data taken from a patterned area and obtaining therefrom a frequency spectrum, a peak detector, associated with said spectrum analyzer, for searching said spectrum to find peak frequencies within said spectrum, said peak detector being operable to restrict said search to regions corresponding to peak frequencies found in a learning stage, a frequency filter, associated with said peak detector, for filtering said spectrum about said peak frequencies, and a maximum likelihood fitter for using parameters obtained in said learning stage to carry out maximum likelihood fitting of said filtered spectrum to obtain at least said layer thicknesses.

2. The apparatus of claim 1, wherein said reflection data is obtained from polychromatic light irradiation of said patterned area.

3. The apparatus of claim 1, wherein said spectrum analyzer comprises a spectrometer, a dispersion corrector, a wave number transformer and a Fourier transformer.

4. The apparatus of claim 1, wherein said peak frequencies found in said learning stage correspond to layer thicknesses of an initial sample.

5. The apparatus of claim 4, wherein said layer thicknesses of said initial sample are determined in said learning stage by using spectral analysis to construct a spectrum at a higher resolution than that obtained by said spectrum analyzer.

6. The apparatus of claim 1, wherein said frequency filter is operable to find minima on either side of each peak and to carry out filtering for each peak by filtering a range defined by said minima.

7. Thickness measurement apparatus for measuring layer thicknesses on patterned areas of a semiconductor wafer, the apparatus comprising:
 a) an input spectrum analyzer for obtaining a reflection spectrum from respective patterned areas of semiconductor wafers,
 b) a learn mode unit comprising:
  a peak detector, associated with said spectrum analyzer, for searching said spectrum to find peak frequencies within said spectrum, said peak detector being operable to restrict said search to regions corresponding to expected thicknesses of layers in said patterned areas,
  a frequency filter, associated with said peak detector, for filtering said spectrum about said peak frequencies,
  a high resolution spectrum analyzer for obtaining parameters from said filtered spectrum for use in maximum likelihood fitting, and
  a maximum likelihood fitter for using said parameters to carry out maximum likelihood fitting of said filtered spectrum to obtain at least learn mode layer thicknesses; and
 c) a run mode unit comprising:
  a peak detector, associated with said spectrum analyzer, for searching said spectrum to find peak frequencies within said spectrum, said peak detector being operable to restrict said search to regions corresponding to peak frequencies found by said learn mode unit,
  a frequency filter, associated with said peak detector, for filtering said spectrum about said peak frequencies,
  and a maximum likelihood fitter for using said parameters obtained by said learn mode unit to carry out maximum likelihood fitting of said filtered spectrum to obtain said layer thicknesses.

8. The apparatus of claim 7, wherein said high resolution spectrum analyzer is operable to obtain said parameters by constructing a new spectrum at a resolution higher than a resolution obtained by said input spectrum analyzer.

9. A method for measuring layer thicknesses on patterned areas of a semiconductor wafer, the method comprising:
 obtaining reflection data taken from a patterned area,
 obtaining therefrom a frequency spectrum,
 searching said spectrum to find peak frequencies within said spectrum said search being restricted to regions corresponding to peak frequencies found in a learning stage,
 filtering said spectrum about said peak frequencies,
 and using parameters obtained in said learning stage to carry out maximum likelihood fitting of said filtered spectrum to obtain said layer thicknesses.

10. The method of claim 9, wherein said reflection data is obtained from polychromatic light irradiation of said patterned area.

11. The method of claim 9, wherein obtaining said frequency spectrum comprises measuring the spectrum of said reflection data, correcting for dispersion, transforming for wave number and carrying out Fourier transforming.

12. The method of claim 9, wherein said peak frequencies found in said learning stage correspond to layer thicknesses of an initial sample.

13. The method of claim 12, wherein said layer thicknesses of said initial sample are determined in said learning stage by using spectral analysis to construct a spectrum at a higher resolution than that obtained by said spectrum analyzer.

14. The method of claim 9, wherein said filtering said spectrum comprises finding minima on either side of each peak and carrying out filtering for each peak over a range defined by said minima.

15. Method for measuring layer thicknesses on patterned areas of a semiconductor wafer, comprising:
 a) a stage of obtaining a reflection spectrum from respective patterned areas of semiconductor wafers,
 b) a learning stage comprising:
  searching said spectrum to find peak frequencies within said spectrum, whilst restricting said search to regions corresponding to expected thicknesses of layers in said patterned areas,
  filtering said spectrum about said peak frequencies,
  obtaining parameters from said filtered spectrum for use in maximum likelihood fitting, and
  using said parameters to carry out maximum likelihood fitting of said filtered spectrum to obtain learn mode layer thicknesses; and
 c) a run stage comprising:
  searching said spectrum to find peak frequencies within said spectrum, whilst restricting said search to regions corresponding to peak frequencies found in said learning stage,
  filtering said spectrum about said peak frequencies, and
  using said parameters obtained in said learning stage to carry out maximum likelihood fitting of said filtered spectrum to obtain said layer thicknesses.

16. The method of claim 15, wherein said stage of obtaining parameters from said filtered spectrum for use in maximum likelihood fitting comprises constructing a higher resolution version of said obtained reflection spectrum.

17. Apparatus for controlling a semiconductor wafer production line, said production line having a plurality of stations, successive stations being for carrying out successive processes on wafers to add features to said wafers, at least one of said stations having a measuring unit for providing measurements of layers on a patterned surface part of a respective wafer, the measuring unit comprising:
 a spectrum analyzer for obtaining reflection data taken from a patterned area and obtaining therefrom a frequency spectrum,
 a peak detector, associated with said spectrum analyzer, for searching said spectrum to find peak frequencies within said spectrum, whilst restricting said search to regions corresponding to peak frequencies found in a learning stage,
 a frequency filter, associated with said peak detector, for filtering said spectrum about said peak frequencies,
 and a maximum likelihood fitter for using parameters obtained in said learning stage to carry out maximum likelihood fitting of said filtered spectrum to obtain said layer thicknesses, said layer thicknesses being usable as control signals for said wafer production line.

18. The apparatus of claim 17, wherein said reflection data is obtained from polychromatic light irradiation of said patterned area.

19. The apparatus of claim 17, wherein said spectrum analyzer comprises a spectrometer, a dispersion corrector, a wave number transformer and a Fourier transformer.

20. The apparatus of claim 17, wherein said peak frequencies found in said learning stage correspond to layer thicknesses of an initial sample.

21. The apparatus of claim 17, wherein said layer thicknesses of said initial sample are determined in said learning stage by using spectral analysis to construct a spectrum at a higher resolution than that obtained by said spectrum analyzer.

22. The apparatus of claim 17, wherein said frequency filter is operable to find minima on either side of each peak and to carry out filtering for each peak by filtering a range defined by said minima.

23. The apparatus of claim 17, wherein said measuring units are located to take thickness measurements before, during and after processing at a given station.

24. Apparatus for controlling a semiconductor wafer production line, said production line having a plurality of stations, successive stations being for carrying out successive processes on wafers to add features to said wafers, at least one of said stations having a measuring unit for providing measurements of layers on a patterned surface part of a respective wafer, the measuring unit comprising:

a) an input spectrum analyzer for obtaining a reflection spectrum from respective patterned areas of semiconductor wafers, b) a learn mode unit comprising:
    a peak detector, associated with said spectrum analyzer, for searching said spectrum to find peak frequencies within said spectrum, whilst restricting said search to regions corresponding to expected thicknesses of layers in said patterned areas,
    a frequency filter, associated with said peak detector, for filtering said spectrum about said peak frequencies,
    a high resolution spectrum analyzer for obtaining parameters from said filtered spectrum for use in maximum likelihood fitting, and
    a maximum likelihood fitter for using said parameters to carry out maximum likelihood fitting of said filtered spectrum to obtain learn mode layer thicknesses; and c) a run mode unit comprising:
    a peak detector, associated with said spectrum analyzer, for searching said spectrum to find peak frequencies within said spectrum whilst restricting said search to regions corresponding to peak frequencies found by said learn mode unit,
    a frequency filter, associated with said peak detector, for filtering said spectrum about said peak frequencies,
    and a maximum likelihood fitter for using said parameters obtained by said learn mode unit to carry out maximum likelihood fitting of said filtered spectrum to obtain said layer thicknesses said layer thicknesses being usable as control signals for said wafer production line.

25. The apparatus of claim 24, wherein said high resolution spectrum analyzer is operable to obtain said parameters by constructing a new spectrum at a resolution higher than a resolution obtained by said input spectrum analyzer.

26. The apparatus of claim 24, wherein said measuring units are located to take thickness measurements before, during and after processing at a given station.

* * * * *